US 6,549,785 B1

(12) United States Patent
Agin (10) Patent No.: US 6,549,785 B1
(45) Date of Patent: *Apr. 15, 2003

(54) METHOD FOR IMPROVING PERFORMANCES OF A MOBILE RADIOCOMMUNICATION SYSTEM USING A POWER CONTROL ALGORITHM

(75) Inventor: Pascal Agin, Sucy en Brie (FR)

(73) Assignee: Alcatel, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 31 days.

This patent is subject to a terminal disclaimer.

(21) Appl. No.: 09/372,086

(22) Filed: Aug. 11, 1999

(30) Foreign Application Priority Data

Jul. 13, 1999 (EP) ................................ 99401766

(51) Int. Cl.[7] .............................. H04Q 7/20; H04B 7/00
(52) U.S. Cl. ........................ 455/522; 455/69; 455/70; 455/67.1; 370/318; 370/320; 370/335
(58) Field of Search ........................ 455/69, 70, 13.4, 455/127, 522, 296, 298, 343, 422, 423–425, 9, 10, 504, 505, 67.1, 67.6, 68, 226.1, 226.2, 226.3; 370/317, 318, 332, 335, 342, 320; 375/148, 224–227, 252, 296, 297, 219

(56) References Cited

U.S. PATENT DOCUMENTS

| | | | |
|---|---|---|---|
| 5,333,175 A | | 7/1994 | Ariyavisitakul et al. |
| 5,386,589 A | * | 1/1995 | Kanai ........................ 455/69 X |
| 5,396,516 A | | 3/1995 | Padovani et al. |
| 5,533,014 A | * | 7/1996 | Willars et al. ............... 370/335 |
| 5,574,984 A | * | 11/1996 | Reed et al. .................... 455/69 |
| 5,839,056 A | * | 11/1998 | Hakkinen ..................... 455/69 |
| 5,883,899 A | * | 3/1999 | Dahlman et al. ............ 370/468 |
| 5,896,368 A | * | 4/1999 | Dahlman et al. ............ 370/335 |
| 6,018,544 A | * | 1/2000 | Kotzin et al. ............. 455/69 X |
| 6,034,952 A | * | 3/2000 | Dohi et al. .................. 370/335 |
| 6,128,506 A | * | 10/2000 | Knutsson et al. ........... 455/522 |
| 6,173,162 B1 | * | 1/2001 | Dahlman et al. ............. 455/69 |
| 6,181,738 B1 | * | 1/2001 | Chheda et al. ............... 375/224 |
| 6,236,865 B1 | * | 5/2001 | Lu ............................ 455/522 |
| 6,341,224 B1 | * | 1/2002 | Dohi et al. .................. 455/522 |
| 6,341,225 B1 | * | 1/2002 | Blanc ......................... 455/522 |
| 6,351,651 B1 | * | 2/2002 | Hamabe et al. ............. 455/522 |
| 6,370,387 B1 | * | 4/2002 | Reemtsma ................... 455/453 |
| 6,385,437 B1 | | 5/2002 | Park et al. |
| 6,405,021 B1 | * | 6/2002 | Hamabe ...................... 455/69 |
| 6,414,946 B1 | * | 7/2002 | Satou et al. ................. 370/328 |
| 6,430,398 B1 | * | 8/2002 | Blanc ........................ 455/67.3 |

FOREIGN PATENT DOCUMENTS

| | | |
|---|---|---|
| EP | 0 853 393 A1 | 7/1998 |
| WO | WO 98/58461 | 12/1998 |
| WO | 00/45528 | 8/2000 |

OTHER PUBLICATIONS

A. Sampath et al, "On Setting Reverse Link Target SIR in a CDMA System" IEEE Vehicular Technology Conference, US, New York, IEEE, vol. CONF. 47, pp. 929–933 XP000736744.

EPO Communication dated Aug. 26, 2002 including European Search Report completed Aug. 20, 2002.

\* cited by examiner

Primary Examiner—Tracy Legree
(74) Attorney, Agent, or Firm—Sughrue Mion, PLLC (57) ABSTRACT

A method for improving performances of a mobile radiocommunication system using a power control algorithm for controlling a transmit power according to a transmission quality target value, and an adjustment algorithm for adjusting the transmission quality target value according to transmission requirements, the method including, upon the occurrence of a change in the transmission requirements, bypassing the adjustment algorithm, by applying a corresponding change to the transmission quality target value, so as to adjust it in an anticipated way.

45 Claims, 4 Drawing Sheets

FIG_1 PRIOR ART

FIG_3

FIG_4

METHOD FOR IMPROVING PERFORMANCES OF A MOBILE RADIOCOMMUNICATION SYSTEM USING A POWER CONTROL ALGORITHM

BACKGROUND OF THE INVENTION

The present invention is generally concerned with mobile radiocommunication systems.

The present invention is more particularly concerned with power control techniques used in such systems to improve performances (in terms of quality of service, of capacity, . . . etc.).

The present invention is in particular applicable to mobile radiocommunication systems of CDMA ("Code Division Multiple Access") type. In particular, the present invention is applicable to UMTS ("Universal Mobile Telecommunication System").

As is known, CDMA systems use two types of power control techniques, a so-called open-loop power control technique, and a so-called closed loop power control technique (also called hereinafter CLPC). These power control techniques may be recalled for example for the uplink transmission direction, i.e. from MS ("Mobile Station") to BTS ("Base Transceiver Station"). In the open-loop power control, a MS transmit power is controlled based on the power received by this MS from a BTS. In the CLPC, a MS transmit power is controlled based on the transmission quality of the link between this MS and a BTS, as estimated at this BTS.

The transmission quality of a link between a MS and a BTS depends on the ratio of the received signal power and the interference power, also called SIR (Signal-to-Interference Ratio). When the SIR of a MS is low, or equivalently when the powers of the other MSs are much higher than its power, its performances dramatically decrease. The CLPC algorithm enables to keep the SIR of each user as close as possible to a target SIR.

The principle of the CLPC algorithm is that the BTS periodically estimates the SIR of the received signal from each MS, and compares this estimated SIR to a target SIR ($SIR_{target}$). If the estimated SIR is lower than the target SIR, the BTS sends a power control command to the MS, for the MS to increase its transmit power. Otherwise, the BTS sends a power control command to the MS, for the MS to decrease its transmit power.

The target SIR is an important parameter in such systems. Indeed, if the target SIR value is set to a value higher than necessary, there is a needless contribution to interference level in the system, and therefore a needless degradation of the performances of the system; on the other hand if the target SIR value is set to a value lower than necessary, the performances of the on-going communication are degraded.

The target SIR is generally chosen as a function of the required quality of service, and is currently adjusted by a so-called outer loop algorithm (as opposed to the preceding one also called inner loop algorithm). The principle of the outer loop algorithm is to regularly estimate the quality of service (generally represented by a bit error rate BER or a frame error rate FER for voice services, or a block error rate BLER for data packet services) and to compare the estimated quality with a required quality of service. If the estimated quality is below the required quality of service, the target SIR is increased. Otherwise, the target SIR is decreased.

As opposed to the inner loop algorithm which needs to be rapid to track the SIR variations as closely as possible, the outer loop algorithm needs to be slow, since the quality needs to be averaged over a certain period in order to have a reliable estimate. Typically, in third generation systems like for example UMTS ("Universal Mobile Telecommunications System"), the SIR of the received signal is determined and compared to the target SIR every slot in a frame, while the quality is averaged over several frames (a slot being an elementary time unit in a data unit, or frame, transmitted in such a system, the frame duration being typically equal to 10 ms, and the slot duration to $\frac{1}{15}$ of the frame duration).

Such a slow process may however raise serious problems, in particular when a so-called compressed mode is used.

The downlink compressed mode has been introduced in UMTS in order to make possible for a user equipment (UE) to perform measurements on a frequency different from its downlink transmission frequency. It consists basically in stopping the downlink transmission during a certain amount of time (or transmission gap). Simultaneous uplink and downlink compressed modes can also be used when the measurement frequency is close to the uplink transmission frequency.

Because the instantaneous bit rate will have to be increased during compressed frames (by increasing the coding rate or decreasing the spreading factor), the target SIR also needs to be approximately increased by the same proportion.

Additionally, since the closed-loop power control is no longer active during transmission gaps for downlink and uplink, the performance are significantly degraded, mainly during compressed frames and recovery frames (frames just following compressed frames). The degradation can reach several decibels. In order to keep the same quality of service as in normal (or non-compressed) mode, this effect would also need to be compensated by increasing the target SIR during these frames.

However, the outer-loop power control algorithm is a slow process and several frames will be probably required before changing the target SIR accordingly. Therefore, it is likely that this process is too slow to be able to increase the target SIR in compressed and recovery frames as required. Moreover, the target SIR even risks to be increased just after compressed and recovery frames where it would not be needed.

Thus, there is a need for a faster process than the classical outer-loop algorithm, in compressed mode, to avoid degrading the performances.

More generally there is a need for a faster process than the classical outer-loop algorithm, in any case of change in the transmission requirements, including:

change from a non-compressed mode to a compressed mode, or vice versa, change in required service (in particular change in the transmission rate), change in transmission rate, for a given required service (such as for example data packet services), change in environment conditions (such as mobile speed, radio propagation conditions, . . . ), . . . etc.

Thus there is a general need for a more efficient power control, so as to improve performances.

SUMMARY OF THE INVENTION

An object of the present invention is therefore a method for improving performances of a mobile radiocommunication system using a power control algorithm for controlling a transmit power according to a transmission quality target value, and an adjustment algorithm for adjusting said transmission quality target value according to transmission requirements, said method including, upon the occurrence of a change in said transmission requirements, bypassing said adjustment algorithm by applying a corresponding change to said transmission quality target value, so as to adjust it in an anticipated way.

According to another object of this invention, said method further includes, upon the occurrence of a change in said transmission requirements, bypassing said power control algorithm, by applying a corresponding change to said transmit power, so as to control it in an anticipated way.

In this way, performances are still improved by enabling the transmit power to be as quickly as possible close to the new transmission quality target value.

According to another object of this invention, said change in the transmission requirements includes a change from a non-compressed mode to a compressed mode, and said corresponding change includes an increase in said transmission quality target value, to be applied before a compressed frame.

According to another object of this invention, said change in the transmission requirements includes a change from a non-compressed mode to a compressed mode, and said corresponding change includes an increase in said transmission quality target value, to be applied after a transmission gap of a compressed frame.

According to another object of this invention, said change in the transmission requirements includes a change from a compressed mode to a non-compressed mode, and said corresponding change includes a decrease in said transmission quality target value, to be applied after a compressed frame.

According to another object of this invention, said change in the transmission requirements includes a change from a compressed mode to a non-compressed mode, and said corresponding change includes an increase in said transmission quality target value, to be applied during one or more recovery frames following a compressed frame ending with a transmission gap.

According to another object of the present invention, said transmission quality is represented by a signal-to-interference ratio.

According to another object of this invention, said mobile radiocommunication system is of CDMA type.

According to another object of this invention, said power control is performed in the uplink transmission direction of said mobile radiocommunication system.

According to another object of this invention, said power control is performed in the downlink transmission direction of said mobile radiocommunication system.

Another object of the present invention is a mobile radiocommunication system including at least a transmitting entity and a receiving entity for performing such a method, and wherein means are provided in a first one of said entities, for, upon the occurrence of a change in said transmission requirements, bypassing said adjustment algorithm by applying a corresponding change to said transmission-quality target value, so as to adjust it in an anticipated way.

According to another object of this invention, means are provided in said first entity for determining and /or updating said corresponding change.

According to another object of this invention, means are provided in a second one of said entities for signalling to said first entity previous values necessary for determining and/or updating said corresponding change.

According to another object of this invention, means are provided in a second one of said entities for signalling to said first entity said corresponding change.

According to another object of this invention, means are provided in a second one of said entities for signalling to said first entity the occurrence of a change in said transmission requirements.

According to another object of this invention, means are provided in a second one of said entities for signalling said corresponding change to said first entity together with the signalling of the occurrence of a change in the transmission requirements.

According to another object of this invention, means are provided in any one of said two entities for recording said corresponding change.

According to another object of this invention, one of said two entities is a mobile radiocommunication network entity.

According to another object of this invention, one of said two entities is a mobile station.

Another object of the present invention is a mobile radiocommunication network entity comprising, for performing such a method in said uplink transmission direction:
means for, upon the occurrence of a change in said transmission requirements, bypassing said adjustment algorithm by applying a corresponding change to said transmission quality targetvalue, so as to adjust it in an anticipated way.

According to another object of this invention, said mobile radiocommunication network entity further includes:
means for, upon the occurrence of a change in said transmission requirements, bypassing said power control algorithm, by applying a corresponding change to said transmit power, so as to control it in an anticipated way.

Another object of the present invention is a mobile station comprising, for performing such a method in said downlink transmission direction:
means for, upon the occurrence of a change in said transmission requirements, bypassing said adjustment algorithm by applying a corresponding change to said transmission quality targetvalue, so as to adjust it in an anticipated way.

According to another object of the present invention, said mobile station comprises, for performing such a method in said downlink transmission direction:
means for, upon the occurrence of a change in said transmission requirements, bypassing said power control algorithm by applying a corresponding change to said transmit power, so as to control it in an anticipated way.

Another object of this invention is a mobile radiocommunication network entity comprising, for performing such a method in said downlink transmission direction:
means for signalling said corresponding change to a mobile station.

According to another object of this invention a mobile radiocommunication network entity comprises, for performing such a method in said downlink transmission direction:
means for signalling to a mobile station the occurrence of a change in said transmission requirements.

According to another object of this invention, a mobile radiocommunication network entity comprises, for performing such a method in said downlink transmission direction:

means for signalling said corresponding change to a mobile station, together with the signalling of the occurrence of a change in the transmission requirements.

According to another object of this invention, said change in the transmission requirements includes a change from a non-compressed mode to a compressed mode, and/or from a compressed mode to a non-compressed mode, and said signalling is performed together with the signalling of compressed mode parameters.

According to another object of this invention, said change in the transmission requirements includes a change from a non-compressed mode to a compressed mode, and/or from a compressed mode to a non-compressed mode, and said signaled corresponding change includes a component which corresponds to that part of said change in transmission requirements which is due to the transmission gaps of the compressed frames.

According to another object of this invention, said signalling is performed for each compressed frame.

According to another object of this invention, in the case where compressed frames occur periodically, said signalling is performed once for all, for all compressed frames of a thus defined period.

BRIEF DESCRIPTION OF THE DRAWINGS

These and other objects of the present invention will become more apparent from the following description taken in conjunction with the accompanying drawings.

MORE DETAILED DESCRIPTION OF THE INVENTION

Figure 1:
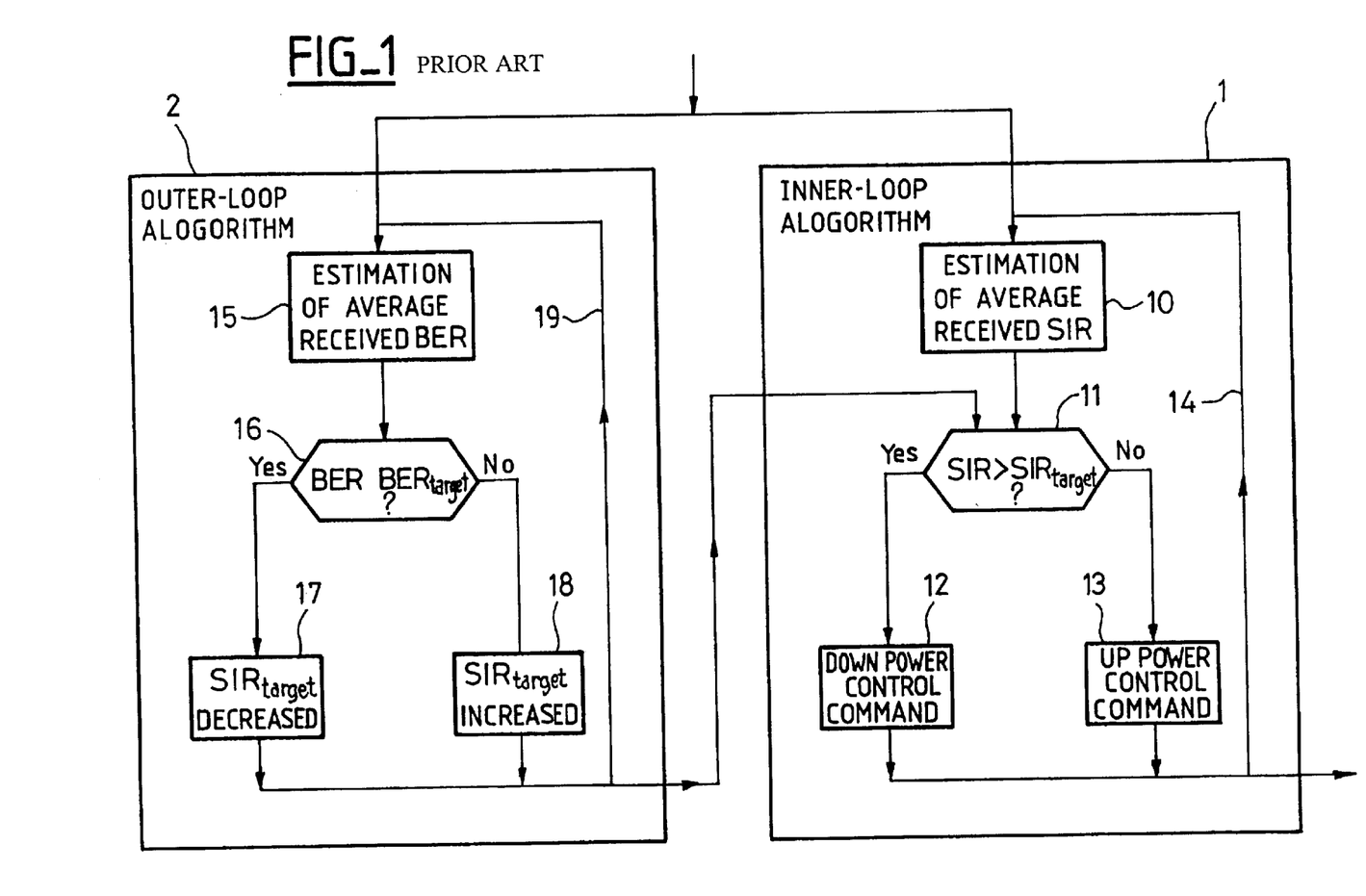
FIG. 1 is a diagram intended to illustrate the different steps of a current power control process (whether in uplink or in downlink)

As recalled in FIG. 1, a current power control process includes an inner loop algorithm (herein also called power control algorithm) 1 and an outer loop algorithm (herein also called adjustment algorithm) 2.

The inner loop algorithm 1 includes the following steps:

At step 10, a receiving entity estimates the averaged received SIR during a period T, At step 11, the receiving entity compares this SIR to a target SIR, $SIR_{traget}$, If $S/R_{22}$ $SR_{target}$, at step 12 the receiving entity sends a "down" power control command to a transmitting entity, for the transmitting entity to decrease its power by δ dB, where δ is the power control step size of the algorithm, if $SIR<SIR_{target}$, at step 13 the receiving entity sends an "up" power control command to the transmitter, for the transmitting entity to increase its power by δ dB.

This is periodically repeated, as illustrated by loop 14.

The outer loop algorithm 2 comprises the following steps:

at step 15, the receiving entity estimates the averaged received quality (for example BER) during a period $T' \geq T$ at step 16, the receiving entity compares this estimated BER to a target BER (representing a required quality of service), If $BER>BER_{target}$, at step 17 $SIR_{target}$ is decreased, if $BER<BER_{target}$, at step 18 $SIR_{target}$ is increased.

This is periodically repeated, as illustrated by loop 19.

An example of modification of power control process so as to include a method according to the present invention will be disclosed in the following. It should however be noted that this example is not limitative and that the invention might as well be applied to other examples of algorithms.

Figure 2:
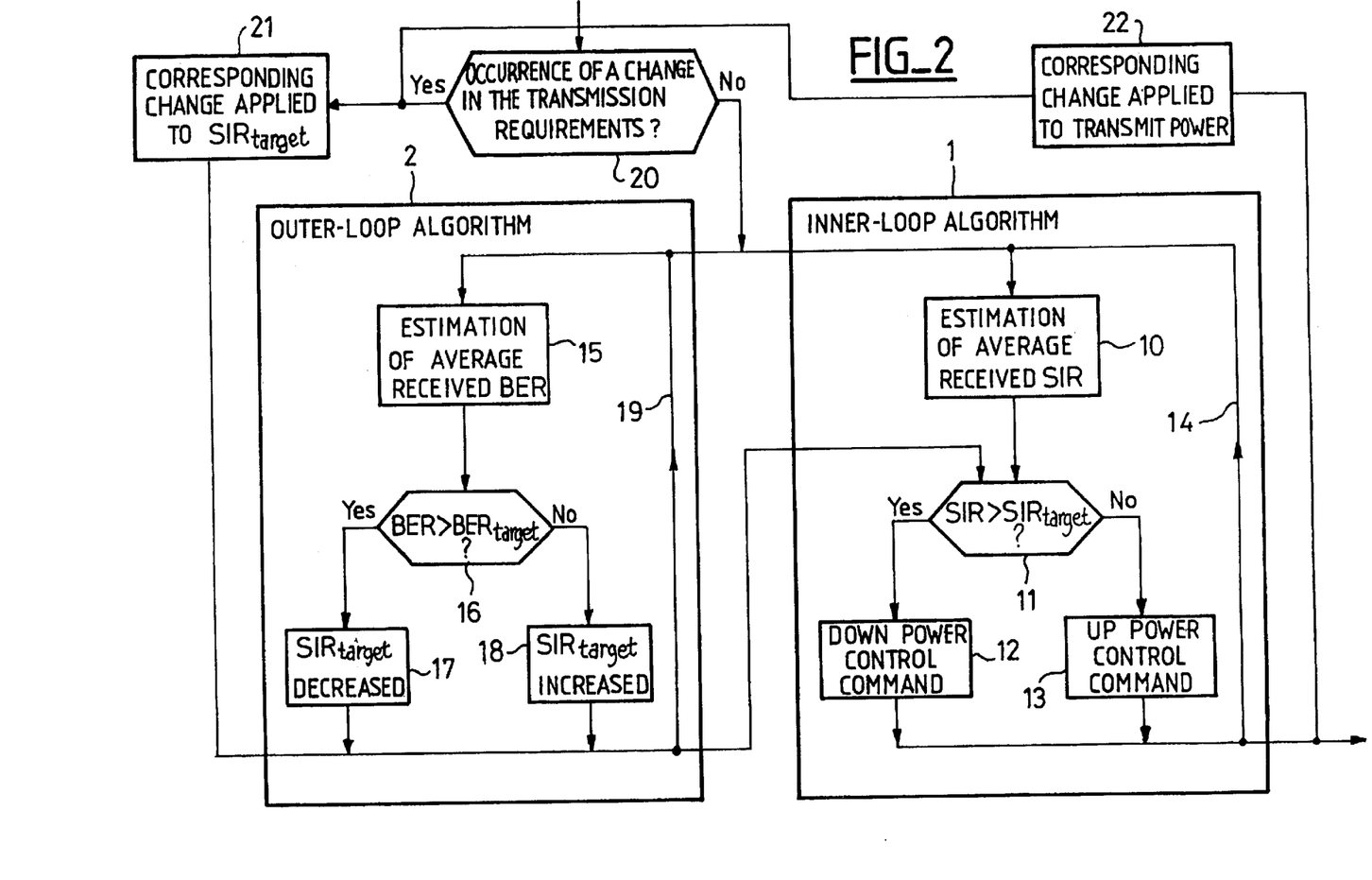
FIG. 2 is a diagram intended to illustrate the different steps of a power control process modified so as to include a method according to the present invention (whether in uplink or in downlink)

In the example of FIG. 2 (where the same references than in FIG. 1 refer to the same elements) a new step 20 is introduced. In this step 20 there is determined if a change has occurred in the transmission requirements.

If such a change has not occurred, the outer loop algorithm 2 is performed as in FIG. 1.

If such a change has occurred, a new step 21 is performed, according to which a corresponding change is applied to said $SIR_{target}$ value, so as to adjust it in an anticipated way, and thereby improve performances.

Besides, in the example of FIG. 2, if such a change has not occurred, the inner loop algorithm is performed as in FIG. 1. If such a change has occurred, a new step 22 is performed, according to which a corresponding change is applied to the transmit power, so as to control it in an anticipated way, and therby still improve performances.

Such corresponding changes, corresponding to such changes in the transmission requirements, may have predetermined values, which may be determined in any way.

For example they may be seen as system parameters and be determined accordingly by the operator of the system. They may also be prealably determined, in particular by simulation. In either case, they may be updated during operation. They may also be determined during operation based on previously obtained values, for example by averaging. In any case the obtention mode of said predetermined values should take into account all factors that are likely to influence said corresponding changes, or combinations of such factors.

Besides, they may be known in any one of the two entities (transmitting entity and receiving entity) involved in a power control process, to be used locally in this entity, or signalled to the other one of said entities, to be used in this entity.

Besides, they may be determined and/or updated in any of said two entities, based on statistics on previously obtained values, available either locally in this entity, or signalled to this entity by the other one of said entities.

Besides, they may be recorded in any one of said entities, to be recovered when necessary.

Besides, the occurrence of a change in the transmission requirements may either be known locally by the entity in charge of applying the corresponding change or signalled to this latter entity by the other one of said entities.

Thus, every possibility may be envisaged; therefore the examples given in this description should be understood as illustrative only, and having no limitative character.

Figure 3:
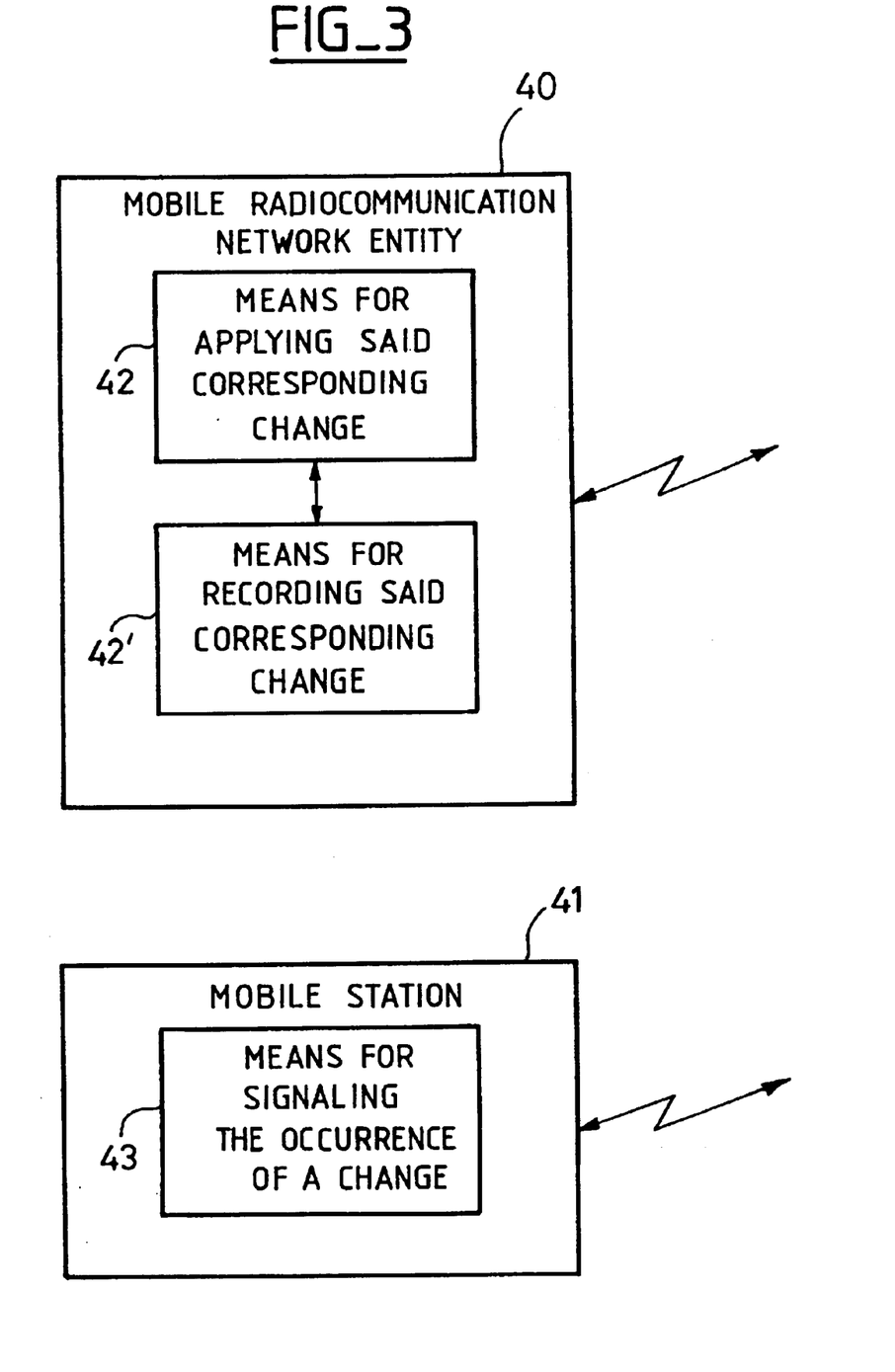
FIG. 3 is a diagram intended to illustrate an example of means which may be used in a mobile station and in a mobile radiocommunication network entity to perform a method according to the present invention, for uplink power control.

FIG. 3 is a diagram intended to illustrate an example of means which may be used in a mobile radiocommunication network entity, noted 40, and in a mobile station noted 41, to perform a method according to the present invention, for uplink power control.

A mobile radiocommunication network entity 40, such as in particular BTS for "Base Transceiver Station" (or Node B in UMTS) and/or BSC for "Base Station Controller" (or RNC for "Radio Network Controller" in UMTS), may comprise, for performing said method in said uplink transmission direction (and further to other classical means not mentioned here):

means 42 for, upon the occurrence of a change in said transmission requirements, bypassing said adjustment algorithm, by applying a corresponding change to said transmission quality target value, so as to adjust it in an anticipated way.

Mobile radiocommunication network entity 40 may also comprise, for performing said method in said uplink transmission direction (and further to other classical means not mentioned here):

means, also noted 42 for, upon the occurrence of a change in said transmission requirements, bypassing said power control algorithm, by applying a corresponding change to said transmit power, so as to control it in an anticipated way.

Such corresponding changes, corresponding to such changes in the transmission requirements, may for example have predetermined values, which may for example be determined according to any of the above mentioned possibilities.

In any case, mobile radiocommunication network entity 40 for example may comprise:

means 42' for recording said corresponding changes.

A mobile station 41 (or User Equipment UE in UMTS) may comprise, for performing said method in said uplink transmission direction (and further to other classical means not mentioned here):

means 43 for signalling to a mobile radiocommunication network entity the occurrence of a change in the transmission requirements.

Figure 4:
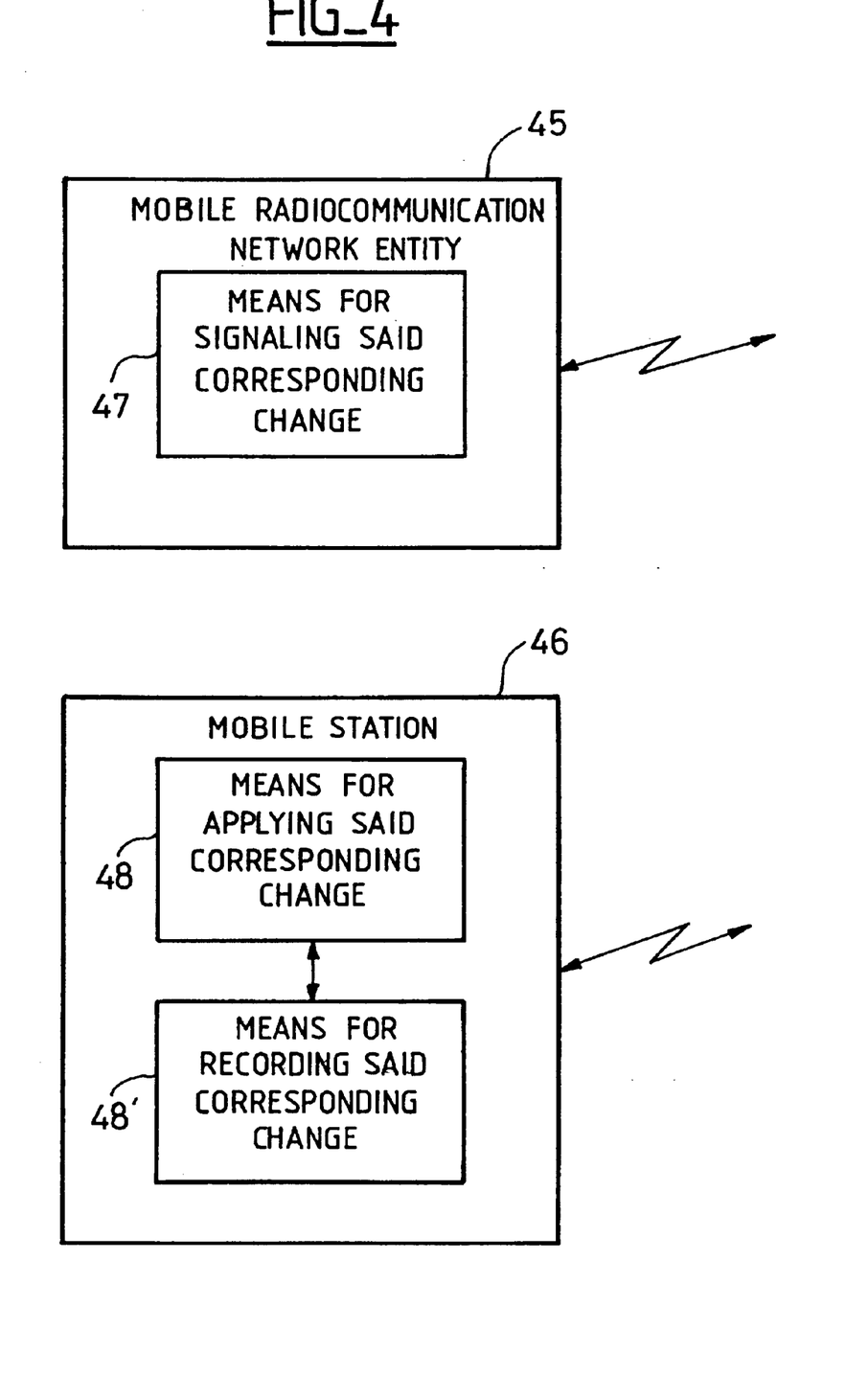
FIG. 4 is a diagram intended to illustrate an example of means which may be used in a mobile radiocommunication network entity and in a mobile station, to perform a method according to the present invention, for downlink power control.

FIG. 4 is a diagram intended to illustrate an example of means which may be used in a mobile radiocommunication network entity, noted 45, and in a mobile station, noted 46, to perform a method according to the present invention, for downlink power control.

A mobile station 46 (or User Equipment UE in UMTS) may comprise, for performing said method in said downlink transmission direction (and further to other classical means not mentioned here):

means 48 for, upon the occurrence of a change in said transmission requirements, bypassing said adjustment algorithm by applying a corresponding change to said transmission quality target value, so as to adjust it in an anticipated way.

Mobile station 46 may also comprise, for performing said method in said downlink transmission direction (and further to other classical means not mentioned here):

means, also noted 48 for, upon the occurrence of a change in said transmission requirements, bypassing said power control algorithm by applying a corresponding change to said transmit power, so as to control it in an anticipated way.

Such corresponding changes, corresponding to such changes in the trasmission requirements, may for example have predetermined values, which may for example be determined according to any of the above mentioned possibilities.

In one embodiment, mobile station 46 may comprise:

means 48' for recording said corresponding changes.

In another embodiment, mobile radiocommunication network entity 45, such as in particular BTS for "Base Transceiver Station" (or Node B in UMTS) and/or BSC for "Base Station Controller" (or RNC for "Radio Network Controller" in UMTS), may comprise, for performing said method in said downlink transmission direction (and further to other classical means not mentioned here):

signalling means 47 for signalling said corresponding change to mobile station 46.

Mobile radiocommunication network entity 45 may also comprise:

signalling means, also noted 47, for signalling to a mobile station the occurrence of a change in the transmission requirements.

Advantageously, mobile radiocommunication network entity 45 may comprise:

signalling means (also noted 47) for signalling said corresponding change to mobile station 46, together with the signalling of the occurrence of a change in the transmission requirements.

The present invention may be applied to any case of occurrence of a change in the transmission requirements, such as for example any of the above mentioned cases, or any combination of a plurality of such cases.

The present invention is however of particular interest together with the use of compressed mode, as now more particularly described.

In order to keep the signaling as low as possible, the target SIR increase due to the increased instantaneous bit rate and the target SIR increase due to degraded performances in compressed frames may be separated, which may be written:

$$\Delta_{SIR} = 10\ \log(R_{CF}/R) + \delta_{SIR}$$

where R is the instantaneous net bit rate before and after the compressed frame and $R_{CF}$ is the instantaneous net bit rate during the compressed frame.

Since the bit rate variation will be known by the UE, only the additional target SIR increase $\delta_{SIR}$ due to degraded performances during compressed frames may be signaled. The signaling overhead can be low if this variation is signaled with other compressed mode parameters (including transmission gap length, periodicity, . . . ). For example, 2 bits could enable to signal the following values of $\delta_{SIR}$:

00: 0 dB
01: 0.5 dB
10: 1 dB
11: 2 dB

Alternatively, $\Delta_{SIR}$ could be directly signaled, but a larger number of bits would be required.

The UE will have to increase the target SIR by $\Delta_{SIR}$ just before the compressed frames (or just after the transmission gap of the compressed frames) and decrease it back by the same value just after the compressed frames. This target SIR variation is done additionally to the usual downlink outer-loop algorithm that will have to take it into account. The Node B may increase simultaneously its transmit power by the same amount before the compressed frame and decrease it just after the compressed frames in order for the downlink received SIR to be as quickly as possible close to this new target SIR.

Moreover, at least when the transmission gap is at the end of the compressed frame, the performances in the recovery frames can also be degraded because of the power control interruption during the transmission gap. Therefore, it would be also desirable to increase the target SIR in recovery frames and to signal this target SIR increase to the UE. Alternatively, the same value ($\delta_{SIR}$) as for compressed frames could be used in order to decrease the required signaling.

Besides, said signalling may be performed for each compressed frame.

Alternatively, in the case where compressed frames occur periodically, said signalling may be performed once for all, for all compressed frames of a thus defined period, in order to reduce the required signalling.

What is claimed is:

1. A method for improving performances of a mobile radiocommunication system using a power control algorithm for controlling a transmit power according to a transmission quality target value, and an adjustment algorithm for adjusting said transmission quality target value according to transmission requirements, said method including, upon the occurrence of a change in said transmission requirements, applying a corresponding change to said transmission quality target value, so as to adjust it in an anticipated way, said adjustment in an anticipated way corresponding to adjustment based on a fixed criteria in addition to said adjustment algorithm.

2. A method according to claim 1, further including, upon the occurrence of a change in said transmission requirements, applying a corresponding change to said transmit power, so as to control it in an anticipated way, said control in an anticipated way corresponding to control based on a fixed criteria in addition to said power control algorithm.

3. A method according to claim 1, wherein said change in transmission requirements includes a change from a non-compressed mode to a compressed mode, and wherein said corresponding change includes an increase in said transmission quality target value, to be applied before a compressed frame.

4. A method according to claim 1, wherein said change in transmission requirements includes a change from a non-compressed mode to a compressed mode, and wherein said corresponding change includes an increase in said transmission quality target value, to be applied after a transmission gap of a compressed frame.

5. A method according to claim 1, wherein said change in transmission requirements includes a change from a compressed mode to a non-compressed mode, and wherein said corresponding change includes a decrease in said transmission quality target value, to be applied after a compressed frame.

6. A method according to claim 1, wherein said change in transmission requirements includes a change from a compressed mode to a non-compressed made, and wherein said corresponding change includes an increase in said transmission quality target value, to be applied during one or more recovery frames following a compressed frame.

7. A method according to claim 1, wherein said transmission quality is represented by a signal-to-interference ratio.

8. A method according to claim 1, wherein said mobile radiocommunication system is of CDMA type.

9. A method according to claim 1, wherein said power control is performed in the uplink transmission direction of said mobile radiocommunication system.

10. A mobile radiocommunication network entity comprising, for performing a method according to claim 1 in the uplink transmission direction of said mobile radiocommunication system: means for, upon the occurrence of a change in said transmission requirements, applying a corresponding change to said transmission quality target value, so as to adjust it in an anticipated way, said adjustment in an anticipated way corresponding to adjustment based on a fixed criteria in addition to said adjustment algorithm.

11. A method according to claim 1, wherein said power control is performed in the downlink transmission direction of said mobile radiocommunication system.

12. A mobile radiocommunication network entity for performing a method according to claim 11 in said down link transmission direction, further including: means for, upon the occurrence of a change in said transmission requirements, applying a corresponding change to said transmit power, so as to control it in an anticipated way, said control in an anticipated way corresponding to control based on a fixed criteria in addition to said power control algorithm.

13. A mobile station comprising, for performing a method according to claim 1 in the downlink transmission direction of said mobile radiocommunication system: means for, upon the occurrence of a change in said transmission requirements, applying a corresponding change to said transmission quality target value, so as to adjust it in an anticipated way, said adjustment in an anticipated way corresponding to adjustment based on a fixed criteria in addition to said adjustment algorithm.

14. A mobile station for performing a method according to claim 9, in said uplink transmission direction, further comprising: means for, upon the occurrence of a change in said transmission requirements, applying a corresponding change to said transmit power, so as to control it in an anticipated way, said control in an anticipated way corresponding to control based on a fixed criteria in addition to said power control algorithm.

15. A mobile radiocommunication network entity comprising, for performing a method according to claim 11 in said downlink transmission direction:
means for signalling said corresponding change to a mobile station.

16. A mobile radiocommunication network entity according to claim 15, wherein, said change in the transmission requirements including a change from a non-compressed mode to a compressed mode, and/or from a compressed mode to a non-compressed mode, said means include means for signalling a component of said corresponding change which corresponds to that part of said change in transmission requirements which is not due to the bitrate increase during compressed frames.

17. A mobile radiocommunication system including a mobile radiocommunication network entity according to any one of claims 15 or 19.

18. A mobile radiocommunication network entity comprising, for performing a method according to claim 11 in said downlink transmission direction:
means for signalling to a mobile station the occurrence of a change in said transmission requirements.

19. A mobile radiocommunication network entity comprising, for performing a method according to claim 11 in said downlink transmission direction:
means for signalling said corresponding change to a mobile station, together with the signalling of the occurrence of a change in the transmission requirements.

20. A mobile radiocommunication network entity according to claim 19, wherein, said change in the transmission requirements including a change from a non-compressed mode to a compressed mode, and/or from a compressed mode to a non-compressed mode, said means include means for signalling said corresponding change together with the signalling of compressed mode parameters.

21. A mobile radiocommunication network entity according to claim 20, wherein said means include means for performing said signalling for each compressed frame.

22. A mobile radiocommunication network entity according to claim 20, wherein, in the case where compressed frames occur periodically, said means comprise means for performing said signalling once for all, for all compressed frames of a thus defined period.

23. A mobile radiocommunication system including at last a transmitting entity and a receiving entity for performing a method according to claim 1, and wherein means are provided in one of said entities, for, upon the occurrence of a change in said transmission requirements, applying a corresponding change to said transmission quality target value, so as to adjust it in an anticipated way, said adjustment in an anticipated way corresponding to adjustment based on a fixed criteria in addition to said adjustment algorithm.

24. A mobile radiocommunication system according to claim 23, wherein means are further provided in one of said entities, for, upon the occurrence of a change in said transmission requirements, applying a corresponding change to said transmit power, so as to control it in an anticipated way, said control in an anticipated way corresponding to control based on a fixed criteria in addition to said power control algorithm.

25. A mobile radiocommunication system according to claim 23, wherein means are provided in a first one of said entities for determining and/or updating said corresponding change.

26. A mobile radiocommunication system according to claim 25, wherein means are provided in a second one of said entities for signalling to said first entity previous values necessary for determining and/or updating said corresponding change.

27. A mobile radiocommunication system according to claim 23, wherein means are provided in a second one of said entities for signalling to a first one of said entities said corresponding change.

28. A mobile radiocommunication system according to claim 23, wherein means are provided in a second one of said entities for signalling to a first one of said entities the occurrence of a change in said transmission requirements.

29. A mobile radiocommunication system according to claim 23, wherein means are provided in a second one of said entities for signalling said corresponding change to a first one of said entities together with the signalling of the occurrence of a change in the transmission requirements.

30. A mobile radiocommunication system according to claim 23, wherein means are provided in any one of said two entities for recording said corresponding change.

31. A mobile radiocommunication system according to claim 23, wherein one of said two entities is a mobile radiocommunication network entity.

32. A mobile radiocommunication system according to claim 23, wherein one of said two entities is a mobile station.

33. A method for improving performances of a mobile radiocommunication system using a power control algorithm for controlling a transmit power according to a target SIR, and an adjustment algorithm for adjusting said target SIR according to transmission requirements, wherein, in compressed mode, the target SIR is increased in compressed frames and/or in frames immediately following the compressed frames.

34. A method for improving performances of a mobile radiocommunication system using a power control algorithm for controlling a transmit power according to a target SIR, and an adjustment algorithm for adjusting said target SIR according to transmission requirements, wherein, in compressed mode, the target SIR is increased in compressed frames by a target SIR increase due to the bit-rate increase in compressed frames and by a target SIR increase due to degraded performances in compressed frames.

35. A method for improving performances of a mobile radiocommunication system using a power control algorithm for controlling a transmit power according to a target SIR and an adjustment algorithm for adjusting said target SIR according to transmission requirements, wherein, in compressed mode, the target SIR is increased in frames immediately following the compressed frames by a target SIR increase due to degraded performances in frames immediately following the compressed frames.

36. A method for improving performances of a mobile radiocommunication system using a power control algorithm for controlling a transmit power according to a target SIR, and an adjustment algorithm for adjusting said target SIR according to transmission requirements, wherein a mobile radiocommunication network entity signals to mobile stations the target SIR increase which is due to degraded performances in compressed frames and/or in frames immediately following the compressed frames, by which mobile stations have to increase the target SIR respectively in compressed frames and in frames immediately following the compressed frames.

37. A method according to claim 36, wherein said target SIR increase is signaled together with other compressed mode parameters.

38. A mobile station for a mobile radiocommunication system comprising means for performing a power control algorithm for controlling a transmit power according to a target SIR, and an adjustment algorithm for adjusting said target SIR according to transmission requirements, said mobile station including means for, in compressed mode, increasing the target SIR in compressed frames and/or in frames immediately following the compressed frames.

39. A mobile station for a mobile radiocommunication system comprising means for performing a power control algorithm for controlling a transmit power according to a target SIR, and an adjustment algorithm for adjusting said target SIR according to transmission requirements, said mobile station including means for, in compressed mode, increasing the target SIR in compressed frames by a target SIR increase due to the bit-rate increase in compressed frames, and by a target SIR increase due to degraded performances in compressed frames.

40. A mobile station for a mobile radiocommunication system comprising means for performing a power control algorithm for controlling a transmit power according to a target SIR, and an adjustment algorithm for adjusting said target SIR according to transmission requirements, said mobile station including means for, in compressed mode, increasing the target SIR in frames just following compressed frames by a target SIR increase due to degraded performances in frames just following compressed frames.

41. A mobile station according to any one of claims 38 to 40, said mobile station further including means for simultaneously increasing its transmit power by the same amount before the compressed frames, and decrease it just after the compressed frames.

42. A mobile radiocommunication system including at least one mobile station according to any one of claims 38 to 40.

43. A mobile radiocommunication network entity for a mobile radiocommunication system comprising means for performing a power control algorithm for controlling a transmit power according to a target SIR and an adjustment algorithm for adjusting said target SIR according to transmission requirements, said mobile radiocommunication network entity including means for signaling to mobile stations the target SIR increase which is due to degraded performances in compressed frames and/or in frames immediately following the compressed frames, by which mobile stations have to increase the target SIR respectively in compressed frames and/or in frames immediately following the compressed frames.

44. A mobile radiocommunication network entity according to claim 43, including means for signaling said target SIR increase together with other compressed mode parameters.

45. A mobile radiocommunication system including at least one mobile radiocommunication network entity according to any one of claims 43 or 44.

\* \* \* \* \*